United States Patent [19]

Petermann et al.

[11] Patent Number: 4,876,672

[45] Date of Patent: Oct. 24, 1989

[54] ULTRASONIC LOGGING TOOL WITH ROTATING EXPOSED TRANSDUCER

[75] Inventors: Steven G. Petermann, Plano; Thomas Schasteen, Garland, both of Tex.

[73] Assignee: Atlantic Richfield Company, Los Angeles, Calif.

[21] Appl. No.: 162,771

[22] Filed: Mar. 1, 1988

[51] Int. Cl.$^4$ .................. R21B 47/00; G01V 1/40
[52] U.S. Cl. ............................ 367/35; 367/25; 367/911; 181/106; 175/50; 73/623
[58] Field of Search ............... 367/25, 35, 32, 911; 181/105, 106; 175/40, 50, 107; 73/623, 633, 637-639

[56] References Cited

U.S. PATENT DOCUMENTS

| | | | |
|---|---|---|---|
| 2,825,044 | 2/1958 | Peterson | 367/32 |
| 3,369,626 | 2/1968 | Zemanek | 181/0.5 |
| 3,378,097 | 3/1968 | Straus et al. | 181/0.5 |
| 3,550,075 | 12/1970 | Kilchie et al. | 340/15.5 |
| 3,668,619 | 6/1972 | Dennis | 340/15.5 BH |
| 3,741,321 | 6/1973 | Slover et al. | 175/40 |
| 3,978,939 | 9/1976 | Trouiller | 181/106 |
| 4,255,798 | 3/1981 | Havira | 367/35 |
| 4,453,409 | 6/1984 | Naumann et al. | 73/639 |
| 4,524,433 | 6/1985 | Broding | 367/25 |
| 4,711,122 | 12/1987 | Angehrn et al. | 73/623 |

FOREIGN PATENT DOCUMENTS

| | | | |
|---|---|---|---|
| 619883 | 12/1976 | U.S.S.R. | 367/25 |
| 1221471 | 2/1971 | United Kingdom | 181/106 |

OTHER PUBLICATIONS

"The Borehole Televiewer", Zemanek et al.; Journal of Petroleum Technology; Jun. 1969; pp. 762 et sec.
"Cement Evaluation Tool"; Froelich et al.; SPE 10207; Society of Petroleum Engineers of AIME; 56th Annual Fall Conf.; San Antonio, Tex.; Oct. 5-7, 1984.
"A Single Tool for Corrosion and Cement Evaluation"; Dumont et al.; SPE 13140; 59th Annual Technology Conf.; Houston, Tex.; Sep. 16-19, 84.

*Primary Examiner*—Nelson Moskowitz
*Attorney, Agent, or Firm*—Drude Faulconer

[57] ABSTRACT

An ultrasonic logging tool (borehole televiewer) which utilizes a rotating transducer which is exposed directly to the fluids in the borehole during logging operations.

9 Claims, 3 Drawing Sheets

FIG. 5

ULTRASONIC LOGGING TOOL WITH ROTATING EXPOSED TRANSDUCER

DESCRIPTION

1. Technical Field.

The present invention relates to an ultrasonic logging tool and more particularly relates to a downhole ultrasonic logging tool wherein the transducer which emits ultrasonic pulses and receives echoes therefrom is exposed directly to the fluids in the borehole and is mounted for 360° rotation in the borehole.

2. Background Art

There are a number of sonic logging tools available which are capable of producing precise and detailed mapping of (1) the wall of an open borehole of a well and/or (2) the inner surface of casing and/or production tubing which is positioned in a well. One such well known logging tool is commonly referred to as the "ultrasonic borehole televiewer" or "BHTV". This type of tool uses a piezoelectric transducer to emit ultrasonic signal pulses as the tool is raised in a borehole. The pulses reflect or bounce off the logged surface (e.g., bore wall, casing/tubing surface, etc.) and generate echoes which are received by the same transducer that emits the pulses. Electronic circuits measure certain parameters, e.g., the amplitude and travel-time of the pulses, and process them into useful information about the surface of interest.

In logging tools of the type described above, the transducer is normally mounted on a shaft or sleeve within the tool and is rotated 360° to completely scan the circumference of the surface being investigated. The rotating transducer is positioned within a chamber in the tool which, in turn, is sealed by a "window", (e.g., a plastic or rubber boot) and is filled with a liquid which provides the necessary acoustical coupling media between the transducer and the well fluids outside the window of the tool (e.g., drilling mud).

During a logging operation, the transducer rotates at approximately three revolutions per second and is pulsed about 500 times per revolution as the tool moves upward in the borehole. At a logging speed of 5 feet per minute, the ultrasonic spot size is usually large enough to provide complete sweep and hence, full coverage of the investigated surface. For further details of typical ultrasonic logging tools, see U. S. Pat. Nos. 3,369,626; 3,379,077; 3,550,075; 3,668,619; and 4,524,433. As mentioned above, these tools are designed primarily to map the topography of a particular surface in a well, be it the wall of an open borehole or the inner surface of a casing or tubing in a borehole.

More recently, other ultrasonic logging tools have been proposed which "look-through" the casing in a borehole to measure or analyze conditions in or behind the casing. For example, ultrasonic tools generate data for evaluating the cement bond between a casing and the borehole and/or for measuring the thickness of the casing to thereby detect corrosion and/or other defects in the casing. A good description of several such tools used for these purposes is set forth in the "Background of the Invention" in U. S. Pat. No. 4,255,798 and is incorporated herein by reference.

These tools, like earlier borehole televiewers, mount an emitting and receiving transducer in a liquid-filled chamber within the tool and emit and receive signals through a window in the tool. However, in all of these tools, the mismatched acoustical interfaces between (1) the transducer and the liquid in the chamber; (2) the liquid in the chamber and the window; and (3) the window and the bore fluids all cause ultrasonic reverberations which can severely mask or otherwise distort the signals generated by the tool. These reverberations seriously complicate the processing of the generated data, especially where sensitive measurements (e.g., casing thickness) are the subject of the logging operation.

Since these reverberations are due to the various interfaces between the acoustically mismatched materials, as described above, it follows that they can be substantially alleviated by reducing the number of interfaces through which the emitted and returned signals must pass. That is, if the transducer can be directly exposed to the borehole fluids, the reverberations caused by the tool liquid surrounding the transducer and the window in the tool are eliminated.

One known ultrasonic logging tool which eliminates both the window and tool liquid interfaces by placing the transducer in direct contact with the well fluid is disclosed in U.S. Pat. No. 4,255,798 (FIGS. 9-14). The tool disclosed therein directly exposes a plurality of individual transducers (8 or more) to the borehole fluids by fixedly mounting each transducer through a separate opening in the wall of the tool housing. The transducers are spaced at 45° intervals and are staggered axially on the housing. Neither the transducers nor the housing is rotated so each transducer will only "log" the spot area of the borehole or casing which lies in front of that particular transducer. While the reverberations in the signals at each exposed transducer are substantially alleviated, the fixed transducers do not provide a complete 360° sweep of the circumference of the borehole or casing being investigated. Accordingly, the log generated by the fixed transducers contains "gaps" which may lie at exactly the critical points of interest (e.g., reduced casing thickness, corrosion, scale, etc.). This possibility that critical points may be missed seriously detracts from the reliability of the log generated by fixed transducer tools.

SUMMARY OF THE INVENTION

The present invention provides an ultrasonic logging tool of the "borehole televiewer" type which substantially reduces reverberations in the signals generated thereby while, at the same time, scans the entire circumference (i.e., 360° ) of the borehole and/or a casing/tubing therein during the logging operation.

Basically, a piezoelectric transducer is exposed directly to the fluids in the borehole (e.g., mud) and is mounted for 360° rotation at the lower end of the logging tool. The transducer emits ultrasonic pulses directly into the borehole fluids and receives echoes therefrom while it is being rotated to scan the entire circumference of the surface being logged.

More specifically, the ultrasonic logging tool of the present invention is comprised of an elongated housing which is attached at its upper end to a logging cable. A drive means, e.g., electric motor, mounted in the housing rotates a hollow drive shaft which, in turn, extends through the lower end of the housing. A rotor is fixed on the drive shaft below the housing for rotation with the shaft. A transducer means having a surface through which ultrasonic pulses are emitted and echo signals are received is mounted on the rotor for rotation therewith with said surface of the transducer being exposed directly to the exterior of the rotor (i.e., the borehole fluid when the tool is in an operable position in a borehole).

A seal means is mounted in lower end of the housing to fluidly seal between the drive shaft and the housing to prevent leakage of the highly erosive borehole fluid into the housing. The seal must have good sealing action around the rotating drive shaft but, at the same time, must have a relatively low drag against the rotating shaft so that the shaft can be driven by a synchronous motor which is preferred in logging tools of this type. In the present tool, to reduce seal drag, a pressure compensating means is provided in the housing which provides a pressure at the interior of the seal which is equal to or slightly greater than the pressure exerted by the borehole fluid acting on the exterior of the seal.

The pressure compensation means is comprised of a pressure sensitive means, i.e., flexible bellows, which is positioned in the housing above the seal means. The housing between the bellows and the interior of the seal means is filled with a non-compressible tool liquid, e.g., mineral oil. A piston is positioned in contact with the bellows and exposed to the borehole fluid through an opening in the housing above the piston whereby the borehole fluid acts on both the piston and the exterior surface of the seal means. That is, the borehole pressure on the piston is transferred through the non-compressible tool liquid via the flexible bellows so approximately the same pressure is applied on the interior of the seal as that applied by the borehole fluid on the exterior thereof. It can be seen that since there is basically a zero pressure differential across the seal, there will be no substantial leakage across the seal and seal drag due to pressure will be minimized. However, to insure that the pressure inside the housing is always greater than the outside pressure, a spring in the housing applies a force to the bellows to supplement that applied by the borehole fluids.

Signals within the tools are transferred between the logging cable at the top of the housing and the transducer mounted on the rotor by means of a slip ring assembly in the housing. The stator of the slip ring is fixed on the housing and is connected to the logging cable by a lead extending through the upper section of the housing. The rotor of the slip ring is fixed to the exterior of the drive shaft for rotation therewith at a point adjacent the stator and is connected to the transducer by a lead extending through the hollow drive shaft.

By alleviating the reverberations caused by multiple acoustical mismatched interfaces, and by scanning the entire surface under investigation, the present invention provides a logging tool which is extremely versatile in that it can be used to perform both the more conventional logging operations carried out by early borehole televiewer-type tools, e.g., mapping of the topography of the walls of an open borehole and/or the inner surfaces of a casing/tubing therein and the more sophisticated logging operations required for cement bond inspection and/or measuring casing thickness.

BRIEF DESCRIPTION OF THE DRAWINGS

The actual construction, operation, and apparent advantages of the present invention will be better understood by referring to the drawings in which like numerals identify like parts and in which.

BEST MODE FOR CARRYING OUT THE INVENTION

Figure 1:
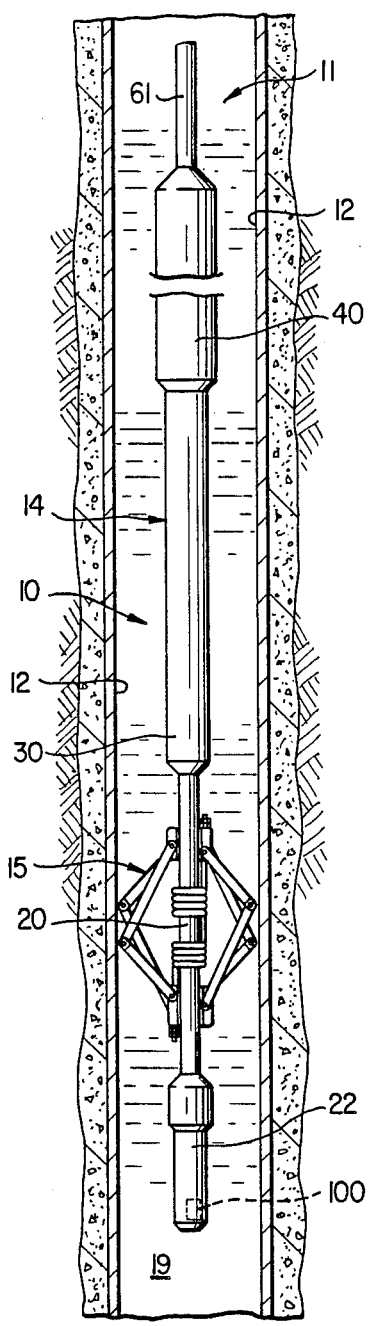
FIG. 1 is an elevational view, partly in section, of the ultrasonic logging tool of the present invention shown in an operable position within a borehole of a cased well.
Figure 2:
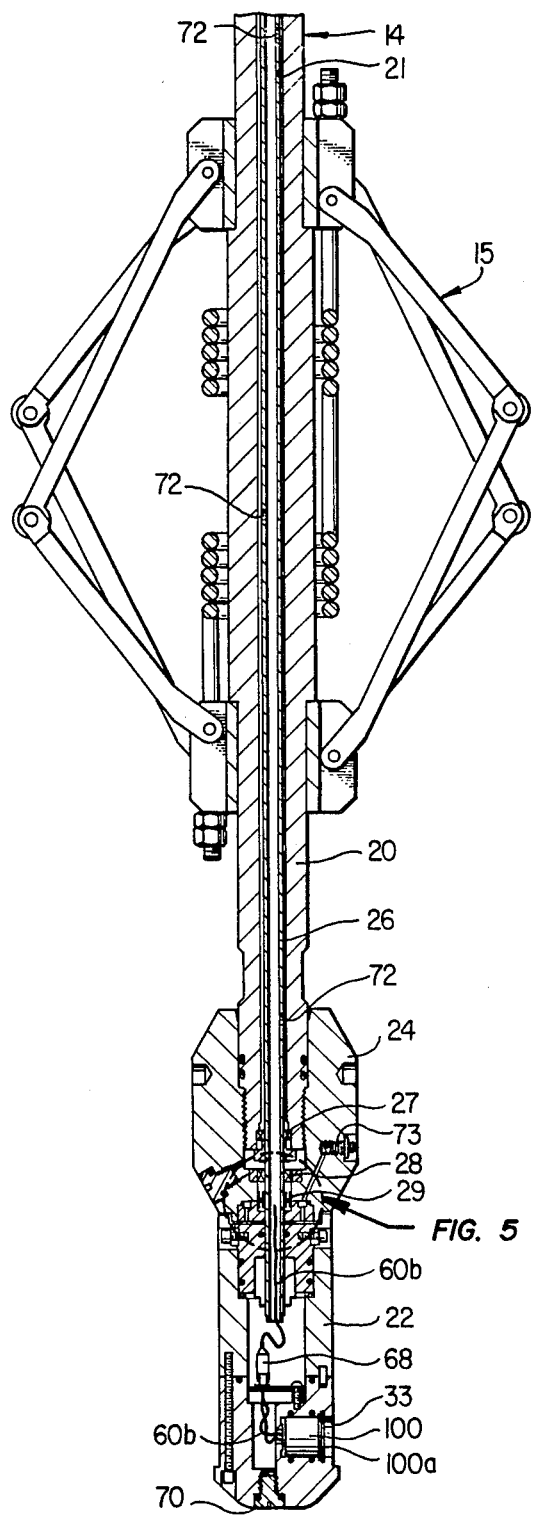
FIG. 2 is a cross-sectional view of the lower section of the ultrasonic logging tool of FIG. 1.

Referring more particularly to the drawings, FIG. 1 illustrates ultrasonic logging tool 10 of the present invention in an operable position within borehole 11 which has casing 12 cemented therein. As will be described in detail below, tool 10 is comprised of housing 14 which, in turn, is comprised of lower section 20 (FIG. 2), middle section 30 (FIG. 3), and upper section 40 (FIG. 4) which are all coupled together to form a single, continuous elongated housing 14. Rotor 22 is positioned outside of housing 14 and is rotated by a motor-driven shaft (described below) which, in turn, extends from the lower end of housing 14. Transducer 100 is fixed on rotor 22 for rotation therewith and is exposed directly to borehole fluid 19 (e.g., drilling mud) in casing 12.

Turning now to the details of tool 10, lower section 20 (FIG. 2) of housing 14 is fixed at its upper end to section 30 by means of coupling 23(FIG. 3) and has collar 24 fixed at its lower end. As understood in the art, centralizer 15 is mounted on the exterior of section 20 to center and stabilize tool 10 as it is raised in borehole 11 during a logging operation. Any of several well known centralizers available for this purpose can be used, e.g., see commonly-assigned, copending U.S. Application No. 07/153,104, filed Feb. 8, 1988.

Section 26 of hollow drive shaft 25 extends completely through bore 21 of housing section 20 and has its lower end journaled in both housing section 20 and collar 24 by means of bearings 27, 28, respectively, or the like.

Figure 5:
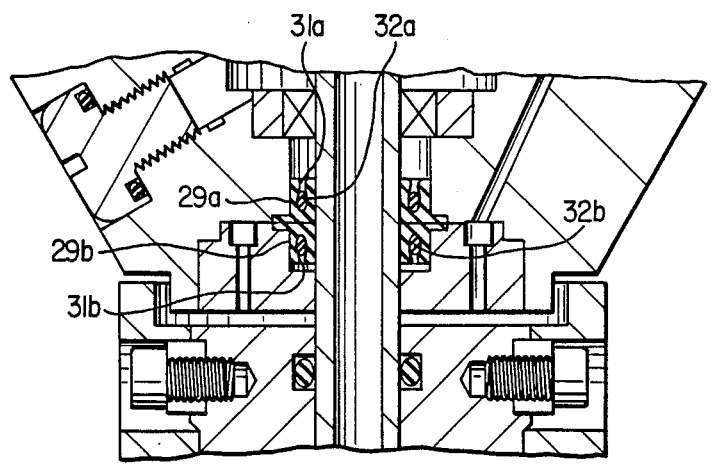
FIG. 5 is an enlarged view of the structure within line 5—5 of FIG. 2.

Fluid-tight, seal means 29 is positioned between collar 24 and drive shaft section 26 to prevent any substantial leakage of fluids from or into housing section 20. Any seal capable of sealing about a rotating shaft can be used as long as the frictional forces therebetween are not so great as to put a prohibitive load on the means driving shaft 26. In other words, seal 29 must provide a good fluid seal while at the same time allowing shaft 25 to rotate smoothly. One preferred seal 29 is comprised of two flourocarbon ring seals 29a, 29b (FIG. 5) which are placed back-to-back as shown. Each seal has an annular groove 31a, 31b therein which receives a circular spring 32a, 32b, respectively which biases the seal into good contact with shaft 26 to continuously compensate for wear due to the rotation of the shaft against the seal. Such seals are known and are commercially available, e.g., Bal Rotary Seal with Hastelloy spring, Bal-Seal Engineering Co., Inc., Santa Ana, Calif.

Hollow rotor 22 is fixed onto the lower end of drive shaft section 26. Transducer 100 is mounted within radial opening 33 in rotor 22 so that the surface 100a of transducer 100 through which signals are emitted and received is directly exposed to the exterior of rotor 22 and is positioned to emit and receive signals in a horizontal plane with respect to the vertical axis of housing 14. Transducer 100 may be any commercially available transducer that is capable of emitting ultrasonic pulses and receiving echoes there form such as those commonly used in logging tools of this type, e.g., piezoelectric transducer such as z broad band ultrasonics transducer made by Etalon Inc., of Lizton, Ind.

Figure 3:
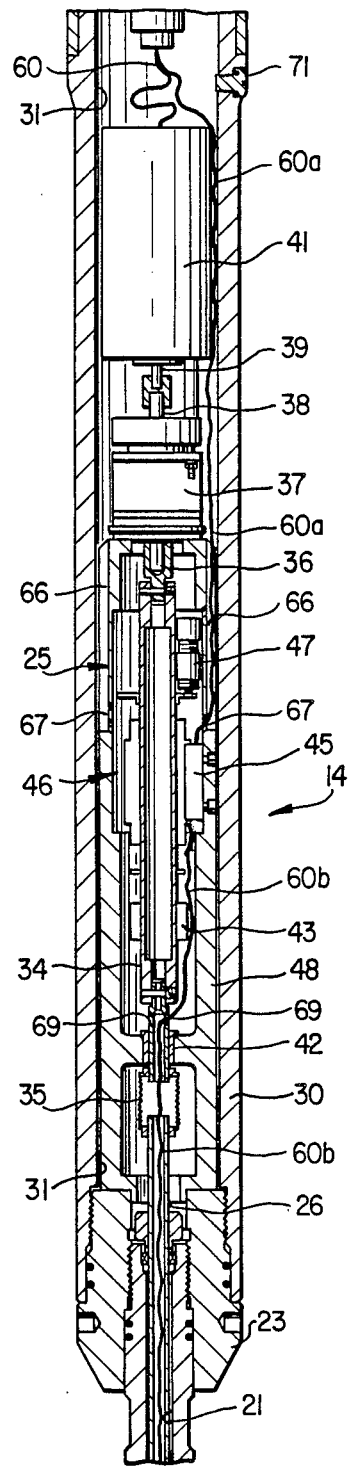
FIG. 3 is a cross-sectional view of the middle section of the ultrasonic logging tool of FIG. 1.

Referring now to FIG. 3, section 26 of drive shaft 25 is connected at its upper end to the lower end of drive shaft section 34 preferably by flexible coupling 35 which compensates for any misalignment of sections 26 and 34 during assembly and which cushions transducer 100 during the starts and stops of rotor 22. The upper end of drive shaft section 34 is affixed to output shaft 36 of gear box 37 which, in turn, has an input shaft 38 connected to the output shaft 39 of drive means 41 (e.g., synchronous electric motor). Mounted on drive shaft section 34 and carried thereby are magnetometer 43, rotor 44 of slip ring assembly 46, and rotational marker 47. Sleeve 48 is positioned in bore 31 of housing section 30 and centers and supports drive shaft section 34 at journal 42. Stator 45 of slip ring assembly 46 is fixed to sleeve 48 and cooperates with rotor 44 to transmit and receive signals to and from transducer 100 as will be further explained below.

Figure 4:
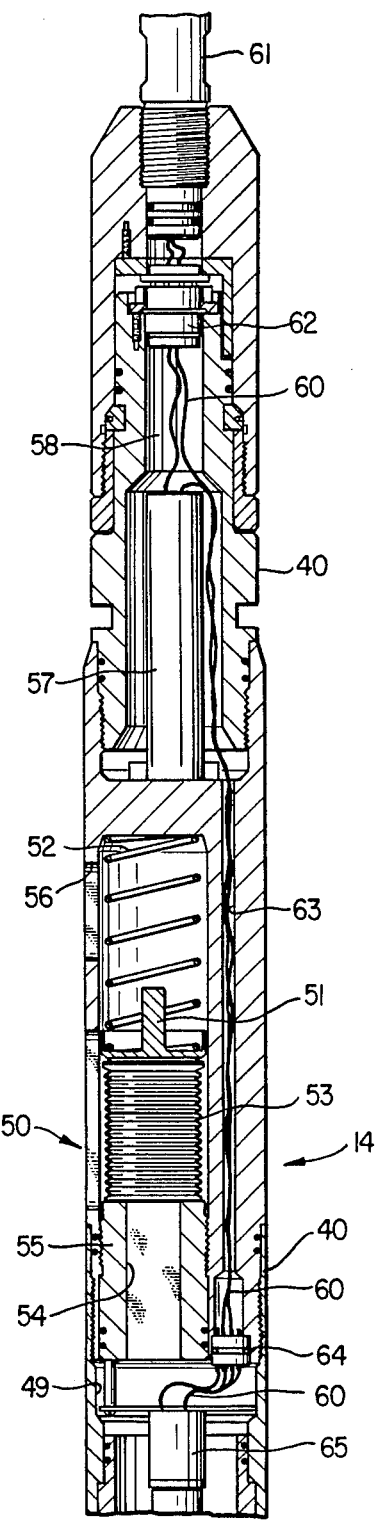
FIG. 4 is a cross-sectional area of the upper section of the ultrasonic logging tool of FIG. 1.

Referring now to FIG. 4, pressure compensating means 50 is positioned within bore 49 of upper housing section 40. Compensating means 50 is comprised of piston 51 which is biased downward by spring 52 against pressure sensitive means, i.e., flexible bellows 53, which, in turn, is in fluid communication with bore 49 of housing section 40 via passage 54 in spacer 55. Upper housing section 40 has an opening 56 through the wall thereof at a point above piston 51 whereby the top of piston 51 is directly exposed to the fluid in the borehole for a purpose discussed below. Capacitor 57 for motor 41 is positioned within fluid-tight compartment 58 in housing section 40. Conductive means, i.e., signal and power leads 60, 60a extend from the surface through logging cable 61, which, in turn, is affixed to the upper end of section 40. Leads 60, 60a pass through connector 62, passage 63 in section 40, feedthrough connectors 64, 65, and the lead 60 is connected to motor 41 to supply power thereto.

Lead 60a passes around motor 41, gear box 37 through passage 66 in sleeve 48, through an opening 67 in sleeve 48, and is connected to stator 45 of slip ring assembly 46. Lead 60b (FIGS. 2, 3) is connected to transducer 100 and passes through connector 68 in rotor 22, through hollow drive shaft 25, out opening 69 in shaft 25, and is connected to rotor 44 of slip ring assembly 46. It will be understood that signals may be transmitted between leads 60a and 60b via slip ring assembly 46 while rotor 22 is being rotated by motor 41.

As stated above, seal 29 (FIGS. 2, 5) has to function to provide a good fluid seal at the lower end of housing 14 but, at the same time, it cannot drag or grip the shaft so tightly that the torque required to rotate shaft 25 exceeds that which is available from synchronous motor 41. To allow seal 29 to meet these requirements, the pressure differential across seal 29 is as balanced as is practical under the circumstances. That is, the internal pressure within housing 14 on the interior of seal 29 is equal to or slightly greater than the borehole pressure acting on the exterior of seal 29. Preferably, the internal pressure is always slightly greater (i.e., positive pressure in housing 14) so that if there is any leakage across seal 29, it will be oil leaking out of the tool rather than erosive borehole fluids, e.g., mud, leaking into the tool.

To establish the desired differential pressure across seal 29, the interior of housing 14 between bellows 53 and the interior surface of seal means 29 is filled with a non-corrosive, non-compressible tool liquid, e.g., mineral oil, preferably by applying a vacuum through opening (shown closed by plug 70 in FIG. 2) in the bottom of rotor 22 while flowing oil through an opening (shown closed by plug 71 in FIG. 3) in middle housing section 30. By evacuating the housing 14 during the filling operation, substantially no compressible gasses, i.e., air, will be trapped in the tool liquid assuring its sensitivity to any changes on bellows 53. It can be seen that the tool liquid will fill bellows 53, passage 54 in spacer 55, housing section 30 around motor 41, gear box 37, longitudinal passages 66 in sleeve 48, and will flow into the interior of sleeve 48 through openings 67. The tool liquid then fills sleeve 48 and flows through openings 69 in shaft 25 to fill the interior thereof. Tool liquid flows through the lower end of shaft 25 to fill rotor 22 and through a series of spaced ports 72 in shaft 25 (FIG. 2) to fill housing section 20 around shaft section 26. The tool liquid bleeds through bearings 27, 28 so that the pressure head of the liquid in the housing is applied to the interior of seal 29.

With tool 10 filled as described above, it can be seen that the pressure of the head of borehole fluid 19 is applied through opening 56 (FIG. 4) onto piston 51 and is transferred to the tool liquid in the housing by the action of bellows 53. Spring 52 biases piston 51 against bellows 53 to insure that a "positive" pressure is always applied to the tool liquid within the housing and to compensate for any volume changes of the tool liquid by caused by temperature changes in the borehole. As will be understood, seal 29 may be packed with grease during assembly and the surfaces between collar 24 and rotor 22 can be packed with grease through fitting 73 to further protect against borehole fluid intrusion into tool 10.

In operation, tool 10 is lowered in borehole 11 on logging cable 61 to a depth below the well interval to be investigated. Motor 41 is then actuated to rotate rotor 22 as tool 10 is raised at a desired logging speed in borehole 11. Transducer 100 is actuated to emit and receive signals in the same manner as those used in prior, well known ultrasonic logging tools of this general type. As described above, the necessary communications between logging cable 61 and transducer 100 is established through slip ring assembly 46. The electronics and methods for processing the data gathered by tool 10 forms no part of the present invention.

It is noted that transducer 100 is continuously rotated to scan 360° of the surface being investigated, e.g., casing 12 (FIG. 1), during the logging operation. This complete sweep of the transducer substantially alleviates the possibility that areas of interest of casing 12 (e.g., corrosion, scale, etc.) will be overlooked on the log generated by tool 10. Further, since transducer 100 is exposed directly to borehole fluids 19 (e.g., mud), reverberations in the emitted and received signals caused by multiple unmatched acoustical interfaces are alleviated which substantially enhances the data generated by the present ultrasonic logging tool. This is especially important where the data is to be used in highly sensitive measurements such as the thickness of casing 12.

What is claimed is:

1. An ultrasonic logging tool for use in a borehole of a well filled with borehole fluid, and tool comprising:

a housing;

a drive means mounted in said housing;

a hollow drive shaft coupled to and adapted to be rotated by said drive means, said drive shaft extending out of said housing;

a rotor attached to said drive shaft outside said housing for rotation with said shaft;

a transducer means having a surface for emitting ultrasonic pulses and receiving echoes from said pulses, said transducer means being mounted on said rotor for rotating therewith and with said one surface being directly exposed to the borehole fluid when said tool is in an operable position within said borehole;

seal means mounted in said housing and surrounding said drive shaft for sealing between said shaft and said housing; and pressure compensating means in said housing for providing a pressure in said housing at the interior of said sealing means equal to or greater than the pressure in the borehole fluid applied against the exterior of said seal means when said tool is in an operable position in said borehole.

2. The ultrasonic logging tool of claim 1 including:

a logging cable connected to the upper end of said housing;

a slip ring assembly within said housing having a slip ring rotor mounted on said drive shaft for rotation therewith and a stator fixed in said housing adjacent said slip ring rotor;

conducting means passing through said hollow drive shaft for connecting said transducer means to said slip ring rotor; and conducting means in said housing for connecting said logging cable to said stator.

3. The ultrasonic logging tool of claim 2 wherein said non-compressible liquid fills said hollow drive shaft and said rotor.

4. The ultrasonic logging tool of claim 3 wherein said non-compressible liquid comprises:

mineral oil.

5. The ultrasonic logging tool of claim 3 including:

a centralizer mounted on said housing.

6. The ultrasonic logging tool of claim 5 wherein said drive means comprises:

an electric motor.

7. The ultrasonic logging tool of claim 1 wherein said pressure compensating means comprises:

a pressure sensitive means positioned within said housing above said seal means;

a non-compressible liquid filling said housing between said pressure sensitive means and said interior of said seal means; and an opening through said housing above said pressure sensitive means for establishing fluid communication between the exterior and the interior of said housing whereby said pressure sensitive means is exposed to said borehole fluid when said tool is in an operable position with said borehole.

8. The ultrasonic logging tool of claim 7 wherein said pressure sensitive means comprises:

a flexible bellows.

9. The ultrasonic logging tool of claim 8 wherein said pressure compensating means further comprises:

a piston slidably positioned within said housing and resting on said bellows whereby said pressure of said borehole fluid is applied to said piston to thereby apply said pressure to said bellows; and a spring normally biasing said piston into contact with said bellows to thereby maintain a positive pressure on said bellows.

* * * * *